(12) United States Patent
Vasiloiu et al.

(10) Patent No.: US 9,013,192 B2
(45) Date of Patent: Apr. 21, 2015

(54) INDUCTIVE MEASURING DEVICE FOR DETECTING LENGTHS AND ANGLES

(75) Inventors: Victor Vasiloiu, Braunau am Inn (AT);
Heinz Eisschiel, Braunau am Inn (AT)

(73) Assignee: AMO Automatisierung Messtechnik Optik GmbH, St. Peter am Hart (AT)

( * ) Notice: Subject to any disclaimer, the term of this patent is extended or adjusted under 35 U.S.C. 154(b) by 315 days.

(21) Appl. No.: 13/510,664

(22) PCT Filed: Nov. 15, 2010

(86) PCT No.: PCT/AT2010/000439
§ 371 (c)(1),
(2), (4) Date: May 18, 2012

(87) PCT Pub. No.: WO2011/060465
PCT Pub. Date: May 26, 2011

(65) Prior Publication Data
US 2012/0223724 A1    Sep. 6, 2012

(30) Foreign Application Priority Data

Nov. 18, 2009 (AT) ................ A 1829/2009

(51) Int. Cl.
| G01B 7/14 | (2006.01) |
| G01B 7/30 | (2006.01) |
| G01D 5/20 | (2006.01) |
| G01B 3/00 | (2006.01) |
| G01B 7/00 | (2006.01) |

(52) U.S. Cl.
CPC .............. *G01D 5/2013* (2013.01); *G01B 3/004* (2013.01); *G01B 7/003* (2013.01)

(58) Field of Classification Search
CPC ....... G01B 3/004; G01B 7/003; G01D 5/2013
USPC ................... 324/207.17, 207.24, 207.25, 654
See application file for complete search history.

(56) References Cited

U.S. PATENT DOCUMENTS

| 4,853,604 A | 8/1989 | McMullin et al. |
| 4,893,077 A | 1/1990 | Auchterlonie |

(Continued)

FOREIGN PATENT DOCUMENTS

| DE | 19803249 A | 8/1998 |
| DE | 69925353 | 1/2006 |

(Continued)

*Primary Examiner* — Jermele M Hollington
*Assistant Examiner* — Farhana Hoque
(74) *Attorney, Agent, or Firm* — Lucas & Mercanti, LLP; Klaus P. Stoffel

(57) ABSTRACT

The invention relates to a measuring device for detecting absolution positions, comprising a sensor unit (N, M) as a planar coil structure and a scale having alternating areas of variable reluctance or conductivity along the measuring line. The invention is characterized in that the measuring device has at least two divisions (T1, T2) for determining the absolute position within the measuring length, the at least two divisions being coded aperiodically and in a bitwise manner and extending parallel to each other and, for each bit formation, having opposite effects on a coil element (S2, S3, S4) as part of the entire sensor structure. Preferably, each coil element (S2, S3, S4), comprising its own emitter and receiver windings (E, R), is balanced in offset, and the entire sensor structure provides approximately equal signal amplitudes for each individual bit of the absolute value at any position of the coded scale by means of compensation windings.

7 Claims, 9 Drawing Sheets

(56) References Cited

U.S. PATENT DOCUMENTS

| | | | |
|---|---|---|---|
| 5,233,294 A | | 8/1993 | Dreoni |
| 6,054,851 A | * | 4/2000 | Masreliez et al. ....... 324/207.17 |
| 6,271,661 B2 | | 8/2001 | Andermo |
| 6,611,138 B2 | | 8/2003 | Vasiloiu |
| 7,726,038 B2 | | 6/2010 | Reusing |

| | | | |
|---|---|---|---|
| 2001/0021485 A1 | * | 9/2001 | Flatscher .................. 430/320 |

FOREIGN PATENT DOCUMENTS

| | | |
|---|---|---|
| EP | 0455613 A | 11/1991 |
| EP | 1014041 | 6/2000 |
| EP | 1164358 | 12/2001 |
| EP | 2034201 A | 3/2009 |

* cited by examiner

INDUCTIVE MEASURING DEVICE FOR DETECTING LENGTHS AND ANGLES

The present application is a 371 of International application PCT/AT2010/000439, filed Nov. 15, 2010, which claims priority of AT A1829/2009, filed Nov. 18, 2009, the priority of these applications is hereby claimed and these applications are incorporated herein by reference.

BACKGROUND OF THE INVENTION

The invention relates to an inductively operating absolute length and angle measuring system, in which a coil structure and the corresponding evaluation electronics move in a scanning head along the measuring path relative to the absolutely encoded scale and measures the position, in accordance with DE 19803249 A1 discussed below.

Generally, two types of such devices for position measuring are known, namely the incremental measuring arrangement in which a periodic division is scanned and, by adding or subtracting measuring increments, the relative position scale/scanning unit is computed relative to a reference position, and the absolute measuring arrangement is obtained in the scale/scanning unit for any relative position for a combination of signals generated in the scanning unit which is unique for the entire measuring range.

It is apparent that an absolute measuring device, which when an axis of movement of a plant is switched on, determines the position directly without having to carry out a reference trip to a known position, and additionally, advantageously facilitates in the case of an interruption, a further secure operation of the plant.

Generally, because of the simpler technical conversion, the incremental measuring systems are more widely used and offer higher resolutions and accuracies. For both measuring methods, measuring devices are known which operate on optical, magnetic, capacitive or inductive physical principles.

The invention relates to the inductively operating measuring systems which, compared to optical systems, are significantly less sensitive to external ambient factors and, can achieve a higher accuracy as compared to the magnetic or capacitive systems. For this reason, only the following variation be considered with respect to the state of the art.

EP 1164358 B1 describes a highly accurate inductive incremental measuring system in which a periodic division is scanned be a compensated coil structure and resolutions in the range of <1 μm can be achieved. The measuring system operates on an incremental basis and, therefore, for initializing a drive system, a reference trip is required and, in case of an interruption of the operation, cannot recognize its position assumed last after the operation has started again, and for this reason, may lead to damage to machines and/or persons because of an undesired movement of the axis.

For the family of devices that the invention deals with, basically two methods are used as absolute position measurement. The so-called Nonius method is based on the determination of the phase difference between at least two periodic incremental divisions of different division periods extending along the measurement path. Under limiting conditions concerning resolution of the position measurement and maximum achievable measuring range, a specific phase difference occurs only once and, therefore, each phase difference can be assigned in the electronic evaluation circuit to a specific absolute position.

Additional incremental divisions of further different periods or periods designed to be longer, can facilitate compromises between higher resolution and greater absolute measuring range.

DE 69925353 T2 shows for an absolute measurement device according to the Nonius principle with three incremental divisions of different periods that the achievable ratio of division periods/measurement range in the embodiment paragraph [048] is approximately 2.5 mm/325 mm, and in the embodiment paragraph [0135] approximately 5 mm/2677 mm. Because of the long division period, this means an achievable resolution of 10 μm for a maximum measuring range of only 2,627 mm; accordingly, it is very limited.

The second known method for the absolute positioning determination is the so called "Quasi Random Code" division (FIG. 1), in which a division (T1) with alternating ranges of different lengths in measuring direction is constructed as a plurality of a division period "λ" in such a way that, by scanning "N" adjacent division periods a code word is created which has a length of "N"-Bit and which occurs once for the entire measuring range and can be assigned to a specific absolute position Xi by recoding in a "Look Up Table" (LUT).

FIG. 1 shows an example from the state of the art in which four sensor cells (photo elements) scan an encoded division of an LED in passing light and thereby create a four Bit word for the illustrated relative position, to which is assigned after recoding in the Look Up Table (LUT) a length position Xi. In this measuring arrangement the signals having amplitude "A" have an offset "O" and, for the logical signal formation the signals have to be evaluated at a level "P."

Such devices operating on the optical principle are widely used and are illustrated, for example, by the company Heidenhain in brochure No. 571 470-14.-30-06-2007.

It is generally known that optoelectronic devices are susceptible to contamination, condensation, water, or other foreign bodies which could impair scanning the light ray.

DE 19803249 A1 describes an inductive measuring device with absolute position measuring which, in addition to variations operating according to the Nonius method, also shows absolutely encoded devices. In this case, as described in FIG. 21 in the fourth embodiment, an encoded division of individual bit-related receiver coils is scanned, which are excited by a single emitter coil which surrounds (452) all individual receivers for the generation of signals. In this sensor arrangement, the induction has within the surface of the emitter coil a high gradient and, as a result, the amplitude of the generated signals significantly varies from bit to bit in the individual bit-related receiver coils (457) in dependence on the distance to the emitter coils within the emitter surface.

These aspects are recognized the reference, however, the solution proposed above to increase the emitter coil surface, so that emitter coils are arranged further from the receiver coil, reduces minimally the lack of uniformity of the induction of the individual receiver coils, but decisively reduces the total exciting field strength in the emitter coil surface and, thus, the signal gain, so that the electrical evaluation of the signals becomes even more difficult, especially in the case of a change of the air gap between sensor and scale, which is practically unavoidable for an industrial application.

SUMMARY OF THE INVENTION

It is the object of the invention to describe an inductive, absolutely operating measuring device which reliably generates position information on the rough ambient conditions and with high accuracy for large measuring areas.

In accordance with the invention, the measuring device is composed of a scale with basically encoded division, of alternating areas having different lengths of variable reluctance or conductivity, and from a sensor unit with planar coil structures and its evaluation electronics which are measuring the absolute position in a scanning head in a relative movement in the measurement direction in relation to the scale.

DETAILED DESCRIPTION OF THE INVENTION

The determination of a binary sequence, which defines the entire measuring range of the scale encoding, encoding which delivers when scanned over a length of "N"-Bit a non-reproducible absolute value, is prior art and will not be further explained herein. An example for such an encoding is illustrated under the denotation T1 in FIG. 1 and the following Figures.

The division of the scale composed of a metal strip into which recesses are worked, preferably by photolithographic or electric erosion or similar methods, ensures a higher accuracy or division. In dependence on the selected work parameters of the induction, this metal scale substrate is basically characterized either by a relatively low reluctance or a high conductivity.

As a basis for the further construction of the device, a coil element for scanning the individual scale bits is shown which has its own balanced receivers and emitter coils and, by the scanning of a scale with two encoded divisions (FIG. 2, T1 and T2) which cause effects which are inverted as a result on the sensor element for scanning, so that an almost offset-free signal is generated.

The sensor element (FIG. 2, S2) has approximately the same width "λ" of a bit area of the encoded division and is composed of an emitter coil "E" which surrounds the sensor element surface and is inductively coupled to a receiver coil "R" with two opposite sections "RT1" and "RT2" in the field direction, wherein each section scans one of the two encoded divisions T1 and T2.

In this arrangement, upon the excitation of the emitter coil with a transient signal, for example, a sine wave, in the receiver coil in dependence on the coupling of each section RT1 and RT2 with the partial areas just scanned of the encoded division T1 and T2, causes for each bit in one section an increase of the induced signal and in the other section a weakening of this signal.

Figure 2:
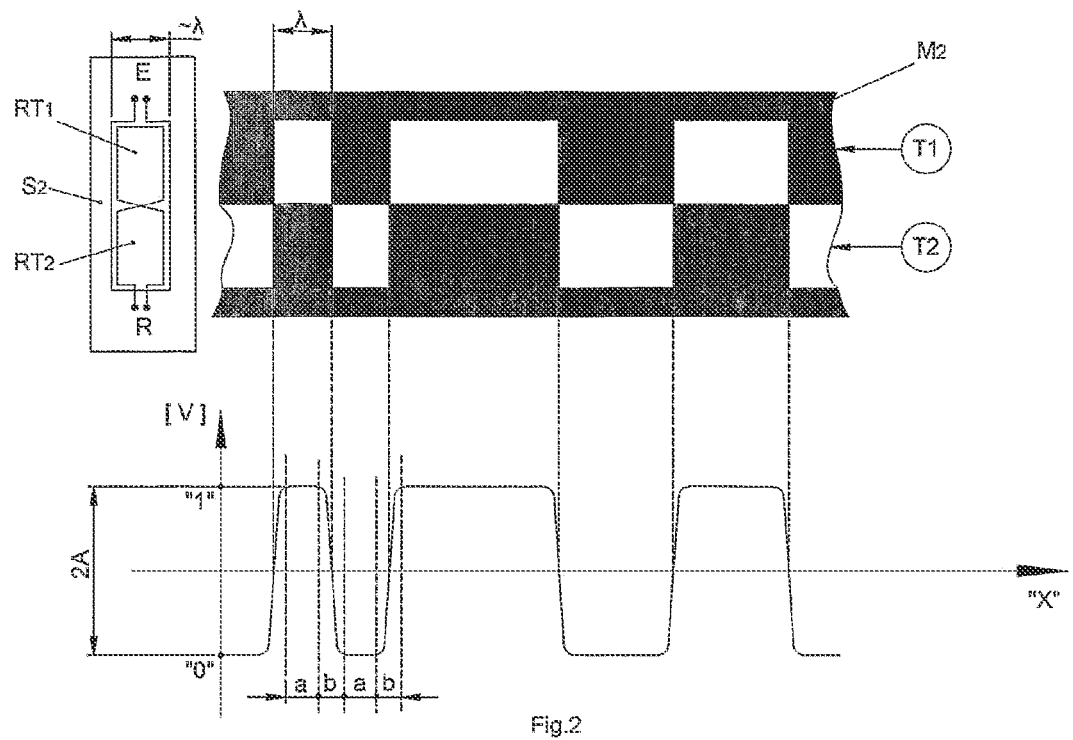
FIG. 2 shows a sensor element according to the invention, including encoded division.

In accordance with this principle, because of the displacement of the sensor element S2 along the scale M2, a signal is generated after demraulation, as illustrated in FIG. 2. Processing of the signal generally is within the expertise of a person skilled in the art and, therefore, will not be described herein.

Figure 1:
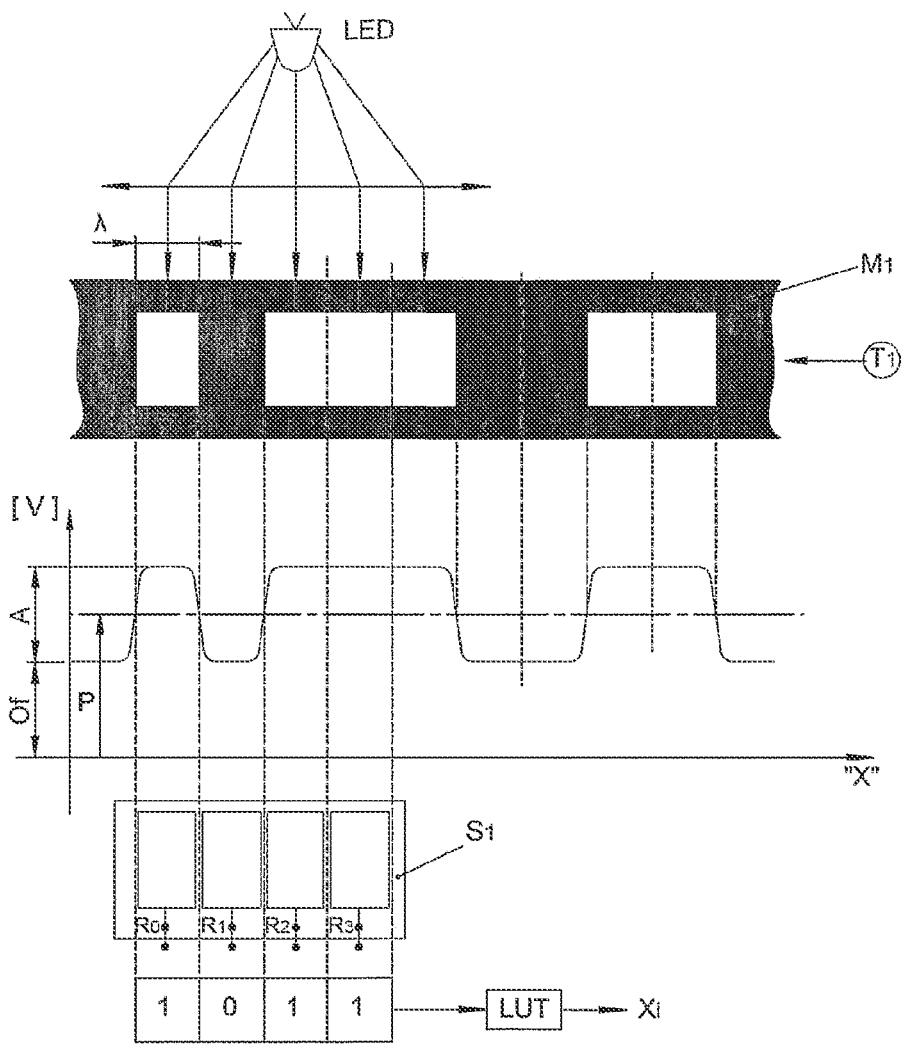
FIG. 1 shows an embodiment according to the state of the art.

Because of the described arrangement, this signal has approximately amplitude 2A which is double that of a single scanning as illustrated in FIG. 1, and approximately a "Zero" offset which is of great significance for the further electrical processing.

The sensor element should have a transmission ratio which is as high as possible and should generate sufficient signal strengths for greater air gaps between sensor S2 and scale M2. For this reason, in analogy with a transformer with moving core, in dependence on the work point and period "λ," the excitation frequency, the number of windings in the excitation (primary) coils and receiver (secondary) coils are dimensioned according to the material properties of the coils and the scale, as well as the dimensions of the scale.

The sensor element is produced according to multilayer technology in which alternating metal and insulation layers can form spiral-shaped planar coils by conductor plate structuring and through contacting.

Figure 3:
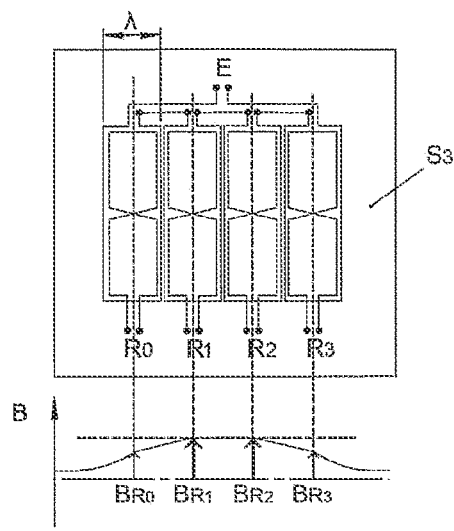
FIGS. 3 and 4 show further developments of the sensor element.

In accordance with the invention, for the formation of an absolute value of N-Bit, which is created by scanning the encoded scale, N equal sensor elements, as illustrated in FIG. 3, are assembled with a spacing of λ. For simplicity's sake of the description, only a four bit sensor structure is illustrated in FIG. 3 and the following Figures.

By the assembly of the sensor elements R0, R1, R2 and R3, the generated electromagnetic fields of the individual bit-related emitters are weakened or strengthened in their interrelations with the adjacent emitters and correspondingly the inductions "B" in the individual bit-related receiver windings are influenced thereby. As symbolically illustrated in the diagram of FIG. 3, the inductions in the middle sensor elements BR1 and BR2 are differently high in comparison to inductions with the outer sensor element BR0 and BR3 and, therefore, the generated measurement signals have different amplitudes.

Useful for the electrical evaluation are advantageously identical output signals for each bit. In accordance with the invention, this uniformity of the exciter fields can be achieved in a row of sensor elements in which additionally compensation exciter coils are arranged at the non-homogenous locations of the electromagnetic field.

Figure 4:
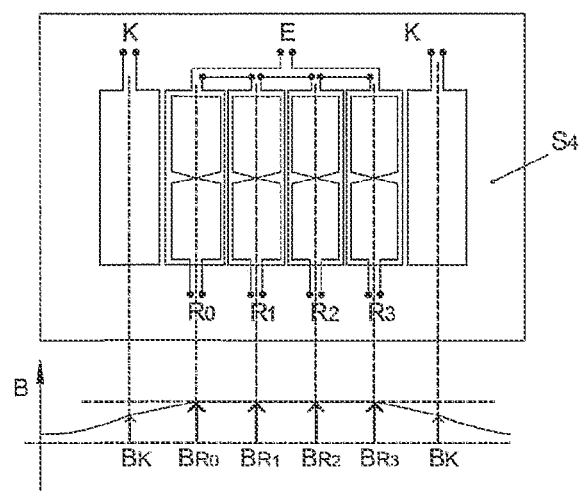

FIG. 4 shows an example for the configuration of a sensor structure with compensation coils in which two compensation coils "K," approximately formed as the emitters of the individual sensor elements and produce approximately equal electromagnetic fields, are arranged at the outer edges of the sensor element row. In this arrangement, as symbolically illustrated in the diagram of FIG. 4 in analogy with the diagram in FIG. 3, all inductions BR0, BR1, BR2, BR3, which produce user signals in the receiver, have the same strength and, as a result, similar signal amplitudes are achieved in the receivers R0, R1, R2, R3.

It is within the knowledge of those skilled in the art to configure, in dependence on the concept of the entire sensor structures, the direction of the individual inductions of these compensation coils, or possibly also only individual compensation conductor plates in such a way that the inductions in the individual sensor elements have approximately the same magnitude.

Figure 5:
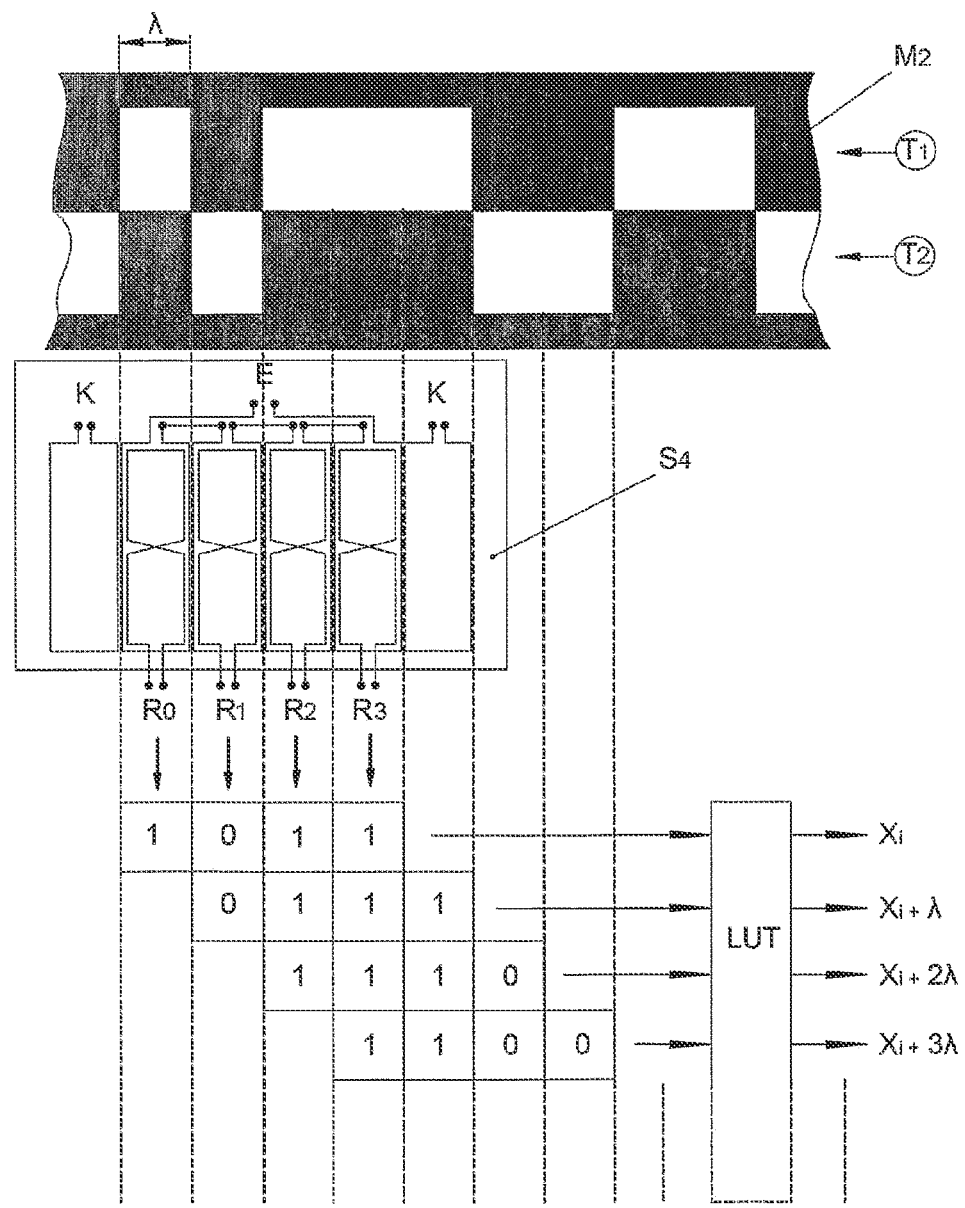
FIG. 5 shows a compensated sensor element with an encoded division.

In FIG. 5, in accordance with the invention, a compensated sensor structure S4 is illustrated in combination with the scale "M2."

The four sensor elements (number serving as an example) synchronously generate through the scale scanning an absolute value of four bit. By displacing the sensor structure by a period "λ" along the scale, a new absolute value is created and so forth for the entire measuring range, of which only a portion is represented herein. In the electronic evaluation is a not fleetingly stored Look Up Table (LUT) which assigns to each absolute value an individual specified position at spacings of λ relative to each other Xi, Xi+X, Xi+2X, and so forth.

As can be seen from FIG. 2, when a sensor element moves continuously along the scale, the output signal either assumes fixed logical values of "0" or "1" in the areas "a," or it has a transient behavior in the areas "b" at the locations where the encoding of the scale changes the logical state. In the areas of the type "b" the conversion of the generated analog signals in fixed logical levels of "0" or "1" causes uncertainties and is therefore to be avoided.

Figure 6:
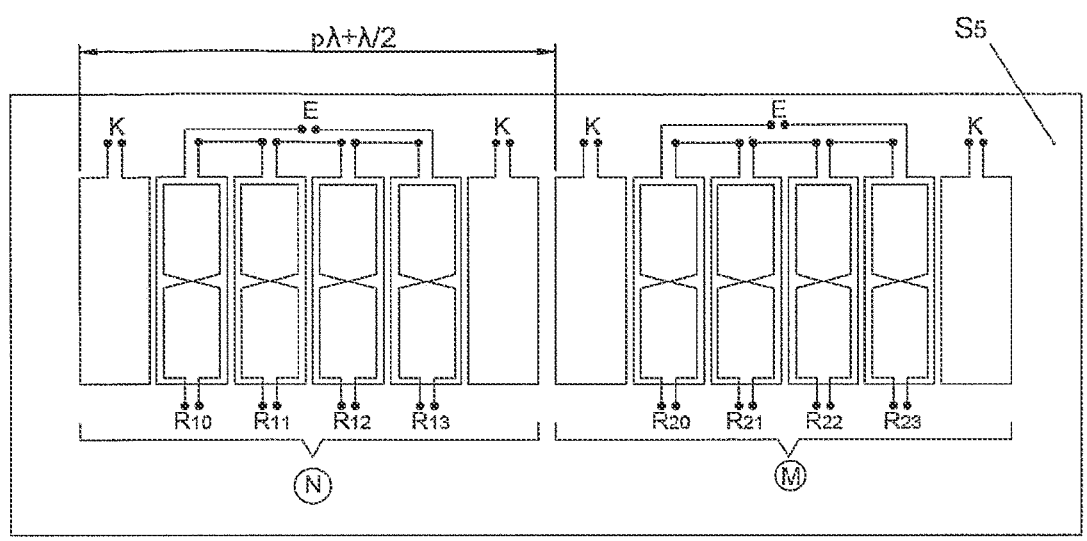
FIGS. 6 and 7 show more further developments of sensor elements.

In accordance with the invention as illustrated in FIG. 6, this uncertainty in the determination of the logical value in the transient areas of the relative position scale/sensor structures can be eliminated by using, in addition to the first sensor structures "N," a second structure "N," preferably configured identically to the first, but offset the measuring direction by $p\lambda+\lambda/2$ and rigidly connected to the first.

This second sensor structure "M" has its fixed value areas of the type "a" precisely at the locations where the first sensor structure "N" has its transient areas "b" so that for each relative position between the sensor unit with two sensor structures is located in a fixedly defined scanning range "a" for the absolute value formation and the scale of either one or the other sensor structure.

Figure 7:
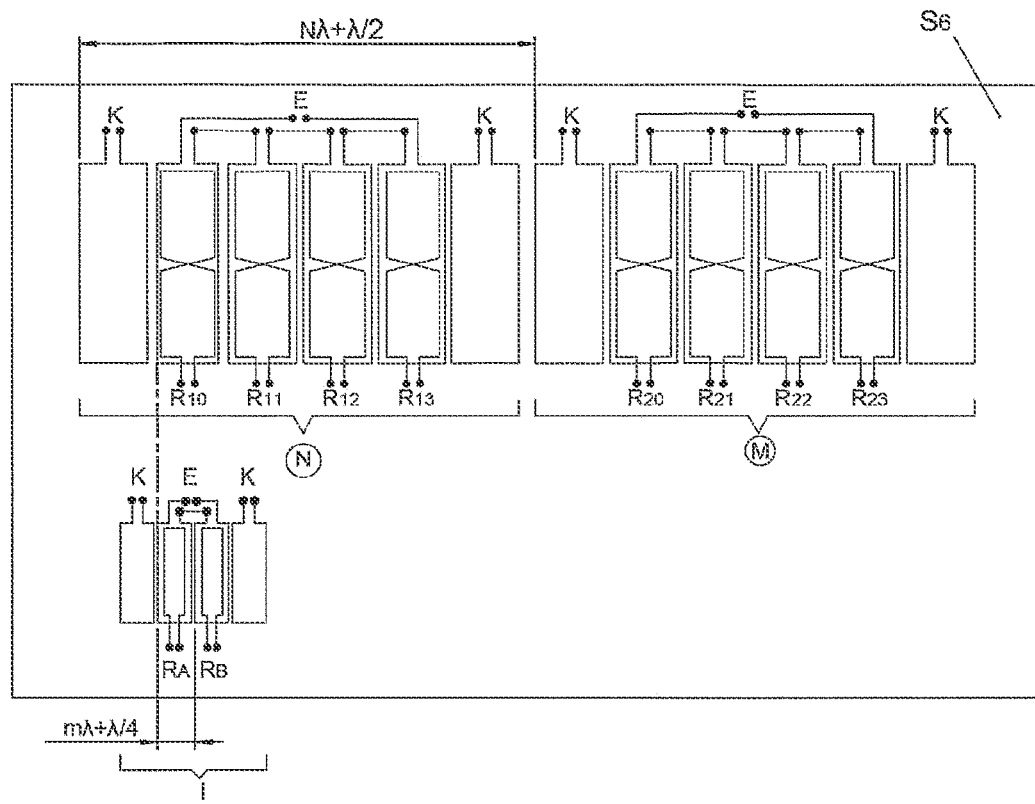
Figure 8:
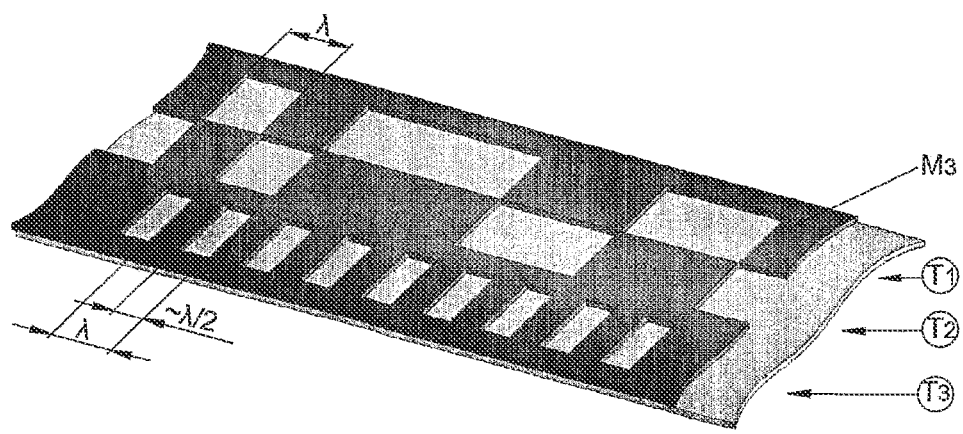
FIG. 8 shows an example of the encoded division.

The offset between the sensor structures is stored in the memory of the evaluation, so that the assignment in the value table LUT is formed in dependence on the sensor structure which has resulted in the position value formation:

For the discrimination which of the two sensor structures N or M is at a given time in a fixed absolute area and is used further for the absolute value formation, as illustrated in FIG. 7, on the sensor unit S6, additionally a periodic incremental division (T3 in FIG. 8) with period λ is scanned.

The inductive scanning of an incremental division of two coil arrangements RA and RB for the formation of two approximately sinusoidal signals (FIG. 9), is not the object of the invention and is described in detail in EP 1164 358 B1. AS an example illustrated in FIG. 7, the incremental sensor structure "I" of the sensor unit S6 with its first sensor RA is illustrated in phase with the first absolute sensor structure, "N".

Figure 9:
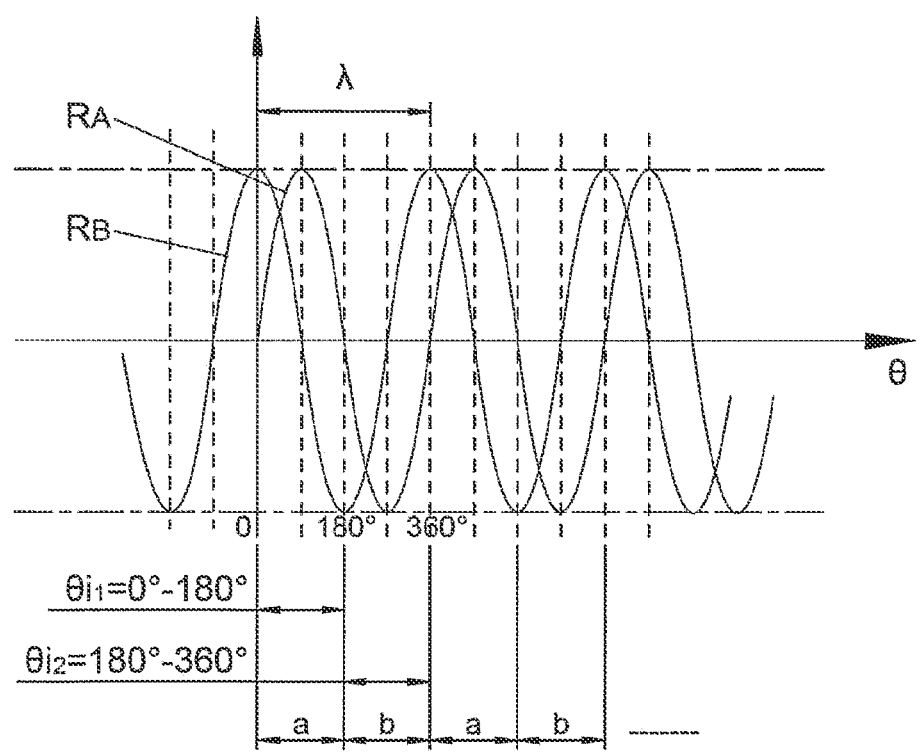
FIG. 9 shows the pattern of the signals.

Under these conditions, the periodic areas $\theta i1=0°÷180°$ and $\theta i2=180°-360°$ of the electrical angle θ, obtained from the incremental sensor structure "I" of the areas "a" and "b" are assigned to the absolute scanning as illustrated in FIG. 9. A discrimination function in the logical electronic circuit determines in dependency of the θ value which of the two absolute sensor structures, N or M, has to measure the absolute position value.

Furthermore, it is the state of the art that electronic circuits, for example, by means of the arctangent method, can interpolate the electrical angle θ in a range of up to about 14 bit.

It is also known that an electronic circuit, which, with the aid of two phase-displaced sine signals, adds the absolute value obtained from the encoded division, through the absolute sensor structures, the incremental position value obtained from the incremental division, through the incremental sensor within a period "X" through the θ angle evaluation. This complete position value can be issued through a serial interface approximately in real time.

In this sensor unit arrangement S6, with compensated coil elements and further compensated sensor structures in connection with a scale type M3 (FIG. 8), as described below as an example, absolute position measuring devices according to the invention can be realized which achieve high accuracies and because of the signal stability and low dependency with the scanning distance variations and ambient influences, can be reliably operated under real industrial conditions.

If, for example, the division period λ=1 mm is selected for a measuring device, the interpolation factor for the angle data is realized at 14 bit, and the number of sensor elements S2 of the absolute sensor structures N and M is set at 16, a measurement system resolution of $A=1$ mm$/2^{14}=0.00006=60$ nanometers is achieved for a maximum measurement range $ML=2^{16}$ mm=65536 mm.

Figure 10:
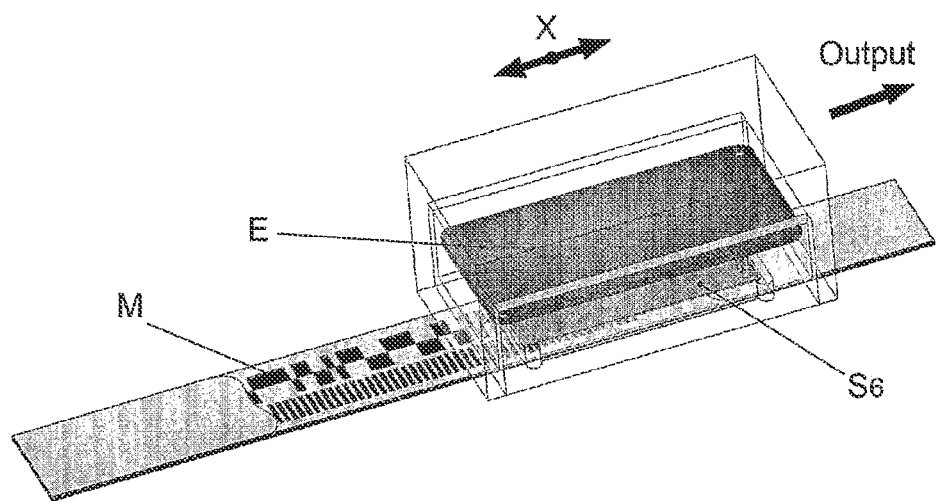
FIGS. 10 and 11 show two measuring arrangements.

A possible configuration of this measuring device for measuring the absolute position "X" in a linear arrangement is illustrated in FIG. 10. The scale with its absolute divisions T1 and T2 and the incremental division T3 is realized as a thin structured strip. The measurement head, which can move over the scale with a defined air gap in the measuring direction "X," includes a sensor unit S6 and an electronic evaluation circuit E which delivers the position at the output.

If the scale M and the sensor unit S6 are realized from a flexible material, they can be bent to an equal specified radius.

Figure 11:
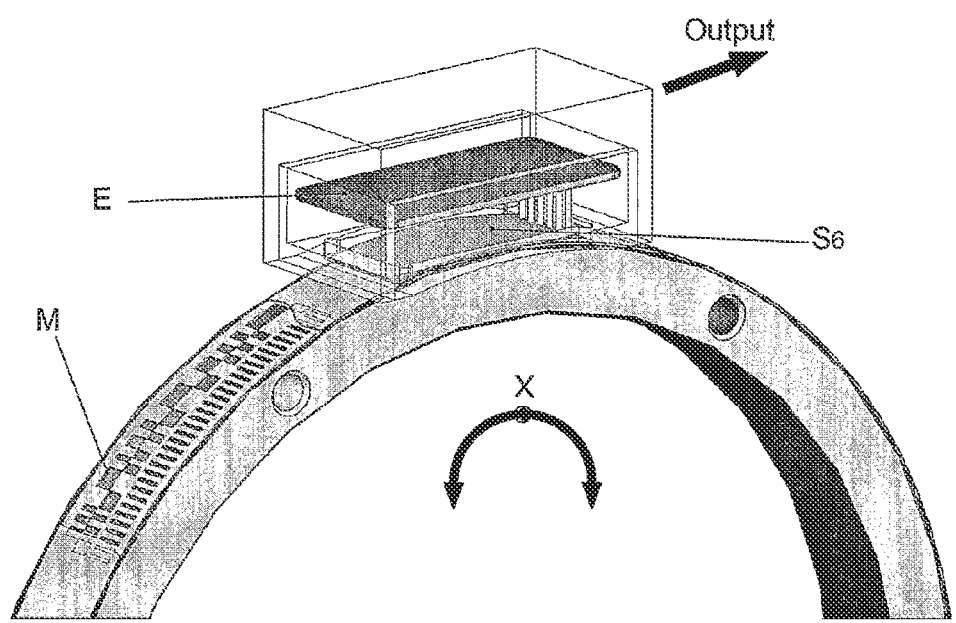

In this embodiment as illustrated in FIG. 11, the position X can be measured as an arc length and the measuring device can, in accordance with the invention, be utilized as an angle measuring device with absolute position output.

The invention is not limited to the illustrated and described embodiments, rather it can be modified in various ways, particularly with respect to the details of the form of the sensor units, the support structures thereof, guidance thereof, etc., etc. The materials used are those which are conventional in measurement technology, those skilled in the art can select in view if the invention and the field of application for which the measurement arrangement is intended.

The invention claimed is:

1. A measurement device for absolute position measuring, comprising: a sensor unit as a planar coil structure having a coil element; and a binary encoded scale with areas of variable reluctance or conductivity along a measurement path, wherein, for measuring the absolute position within a measurement length, at least two parallel divisions which are each encoded aperiodically, bit by bit are provided which for each bit formation have different effects on the coil element, wherein each coil element is balanced in offset and has for each bit scanning quasi enclosed windings for emitter and receiver coils, which by themselves only serve for an individual specified bit formation, wherein the sensor structure, in addition to emitter windings of the coil element, which are necessary for formation of the individual bits, has additional emitter windings or conductor tracks which alone serve for compensation of electromagnetic fields in order to compensate output signals in offset or amplitude.

2. The measuring device according to claim 1, wherein the emitter and receiver coils produced in multilayer technology in at least one winding embodiment.

3. The measuring device according to claim 1, wherein the sensor structure is a first sensor structure, and further comprising a second sensor structure with an offset phase relative to the first sensor structure, which second sensor structure is located in the measuring direction relative to the first sensor structure, wherein the second sensor structure measures the absolute position value in scanning areas where, seen in the measuring direction, the first sensor structure is located in the relative position at the transition areas of the encoding of the divisions.

4. The measuring device according to claim 3, wherein a third periodic, incremental division parallel to the absolute encoded divisions is applied on the scale along the measuring path, and, by measuring the phase position of a signal obtained from the third division, a discrimination of the second coil structure is carried out through the measurement of the absolute position value in the first or second coil structure.

5. The measuring device according to claim 3, wherein the scale and the sensor structures are mounted on flexible substrates and are configured into a cylindrical shape which match each other, so that an absolute angle measurement becomes possible by a rotating relative movement between the scale and sensor structures.

6. The measuring device according to claim 1, wherein each coil composed an emitter and receiver coils is balanced in offset and that the entire sensor structure delivers, through compensation coils, substantially equal signal amplitudes for each individual bit of the absolute value in any chosen position of the encoded scale.

7. An absolutely encoded scale for use in a measuring device according to claim 1, wherein the scale divisions are produced by photolithographic methods or by electro-erosion.

* * * * *